June 18, 1963
J. G. JACKSON
3,094,175
WELL DRILLING APPARATUS AND METHOD
Filed Sept. 15, 1959
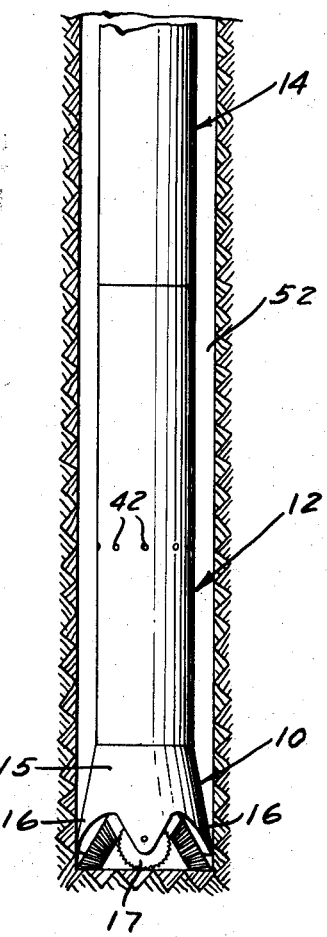
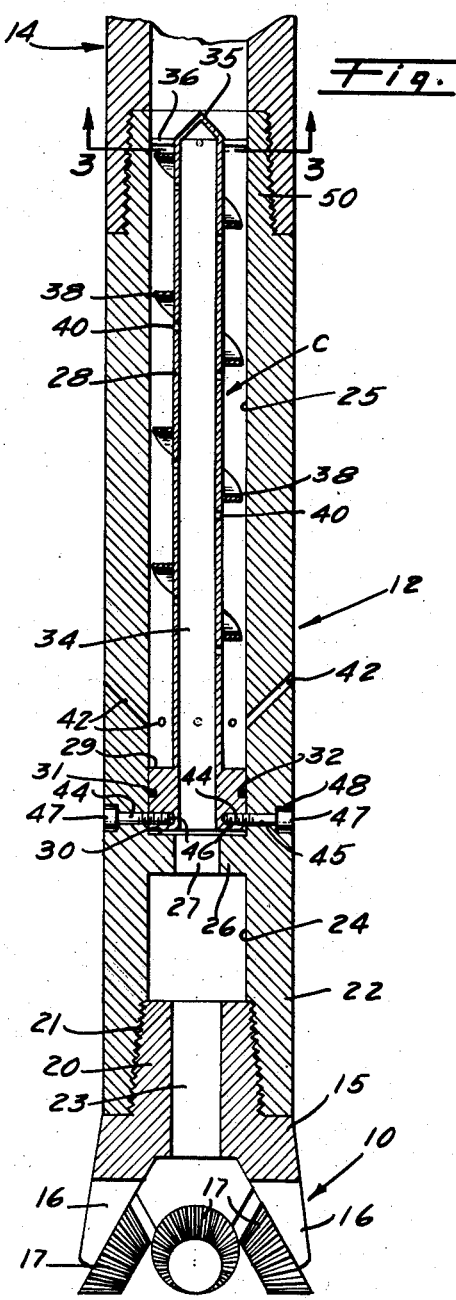
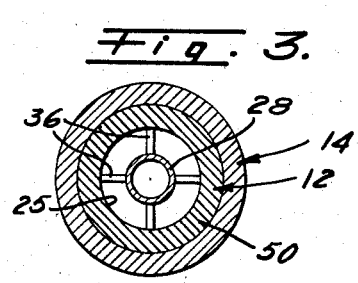
JOHN GORDON JACKSON, INVENTOR.
WHANN & McMANIGAL
Attorneys for Applicant
by ated June 18, 1963

3,094,175
WELL DRILLING APPARATUS AND METHOD
John Gordon Jackson, Denver, Colo., assignor to Well Completions, Inc., Denver, Colo., a corporation of Colorado
Filed Sept. 15, 1959, Ser. No. 840,165
13 Claims. (Cl. 175—69)

This invention relates generally to apparatus for and a method of drilling bore holes into the earth and relates more particularly to such apparatus and method used in the drilling of oil wells and the like.

While the invention has particular utility in connection with the drilling of oil wells and the like utilizing a drilling fluid comprising a mixture of gas and liquid, and is shown and described in such connection, it is to be understood that its utility is not confined thereto.

In the air and gas type of drilling operations various gases may be used, air being one of them and the respective terms are to be understood as covering any of the gases that are known and used in said drilling operations. Also, when the term "liquid" is used herein, it is to be understood as covering water or any of the other liquids and/or chemical agents that are known and used in such drilling operations.

In the air and gas system of drilling oil and gas wells, it is now a common practice to inject water or water and foaming agents down the drill pipe. Under certain drilling conditions there is a tendency for the cuttings to cling to the well bore, drill string, casing, etc. and water or water and a foaming agent is injected into the air or other gas used as a drilling fluid to facilitate the removal of these cuttings.

However, the injected liquid or solution has little or no value at the bottom of the hole where the bit is operating but is actually utilized at a point further up the hole where the clinging action takes place.

As a matter of fact, air and gas drilling is most successful when liquids are not present. In the use of gaseous fluid such as air, for example, as the drilling fluid at the bottom of the hole and about the drilling bit the cuttings are dry so that they will not cause clogging or sticking of the drilling bits and the dry gaseous fluids will pick up the cuttings and carry them upwardly. Thus, faster drilling is possible.

However, after drilling through a wet zone, water or water and chemicals or foaming agents must be injected with the gases to keep the drill string from becoming covered or caked with mud and thereby causing the drill pipe to stick. Also, the presence of water or other liquid at the bit causes the cuttings to be saturated with liquid and results in the bit intimately mixing the cuttings with the water or other liquid. If, on the other hand, the water comes in contact with the cuttings after they are cut, the water will not have time to saturate said cuttings before they are carried to the surface and discharged from the well bore. Further, the foaming agents or chemicals injected with the water or other liquid will coat the cuttings instead of being absorbed by them.

From the foregoing it will be obvious that while there are distinct advantages in the injection of water or water and foaming agents or chemicals into the gaseous fluid in air and gas drilling operations, there are also certain important disadvantages connected with the use of such a mixture of gas and liquid for the drilling fluid.

It is, therefore, an important object of the present invention to provide apparatus and method whereby the disadvantages of drilling operations utilizing air and liquid mixtures for the drilling fluid are eliminated while retaining the advantages of drilling with gas alone and with such a mixture. In accordance with the present invention, the air or gas and liquid or liquids and chemicals, including foaming agents, are mixed at the surface and injected simultaneously into the drill pipe, the gas and liquids being separated in the well, the air or gas passing through the drilling bit and the liquid passing into the annulus about the well string and flowing upwardly from a point above the drilling bit. Thus, the bit can be drilling in a dry area so that the cuttings will be dry and the rest of the drill string can be in a wet area. The liquid in said wet area picks up the dry cuttings resulting from the action of the bit and carries said cuttings upwardly and out of the well, the air again mixing with the liquid in the annulus at a point above the bit.

Still another object of the invention is to provide method and apparatus of this character whereby the rate of penetration of the drilling bit is substantially increased.

A further object of the invention is to provide apparatus and method of this character which will substantially eliminate the coating of the drill string with cuttings.

A still further object of the invention is to provide apparatus and method of this character which will improve the life of the bit because the drilling will be in the presence of dry gas.

Another object of the invention is to provide method and apparatus of this character which will substantially eliminate the saturation of the cuttings with the water or other liquid.

Still another object of the invention is to provide apparatus and method of this character whereby better samples can be obtained at the surface.

A further object of the invention is to provide method and apparatus of this character wherein a lower circulating pressure for the drilling fluid can be maintained because a lesser quantity of liquids will be required.

It is a further object of the invention to provide apparatus and method of this character that is effective in separating the liquids and gases at the desired location in the well adjacent to the space upwardly of the drilling bit.

A still further object of the invention is to provide apparatus of this character that is simple in construction and effective in operation.

The characteristics and advantages of the invention are further sufficiently referred to in connection with the following detailed description of the accompanying drawings which represent one embodiment. After considering this example, skilled persons will understand that many variations may be made without departing from the principles disclosed, and I contemplate the employment of any structures, arrangements, modes of operation or steps of the method that are properly within the scope of the appended claims.

Referring to the drawings, which are for illustrative purposes only:

FIG. 1 is a side view of the lower portion of a drilling string including the bit and device or apparatus embodying the present invention;

FIG. 2 is a longitudinal section through such device and drilling bit; and

FIG. 3 is a sectional view taken on line 3—3 of FIG. 2.

Referring more particularly to FIG. 1, there is diagrammatically shown a drilling bit, indicated generally at 10, attached to the lower end of a separator device, indicated generally at 12. The upper end of the separator device is attached to the lower end of a drill pipe or other part of the drill string, indicated generally at 14.

Referring to FIGS. 1 and 2, the drilling bit is shown as being of the rotary type although any other suitable type of bit may be used. The bit includes a body part 15 having depending arms 16 to which are operably pivoted the usual cutters or cones 17. The bit may be attached to the separator 12 by any suitable means. As shown, the bit is provided with a pin 20 of well-known character upstanding from the body 15 of the bit and screwed into a box 21 of well-known character formed in the lower end of the separator body 22, said pin and bit body having a passage 23 therethrough. The upper end of passage 23 communicates with the lower end of a bore 24 which extends longitudinally upwardly, as viewed in FIG. 2, from the box 21. From the opposite or upper end of the separator body 22 there is a downwardly extending bore 25 which terminates short of the upper end of the bore 24, there being an inwardly extending flange 26 between the bore 24 and bore 25 defining a communicating passage 27 which connects the lower end of the bore 25 with the upper end of the bore 24, the bores 24 and 25 being of substantially the same diameter.

Within the bore 25 there is disposed a tubular member 28 of a separator core C. At the lower end of the tubular member 28 there is an enlarged base 29 adapted to seat on the shoulder 30 provided by the upper surface of the flange 26. The base 29 is provided with sealing means comprising an annular seal 31 disposed in an external annular groove 32, said seal being shown as an O-ring. The interior passage 34 of the tube 28 continues through the base 29 and communicates with the passage 27, the passage 34 in the tube 28 and base 29 being of substantially the same diameter as the passage 27. At the upper end the tubular member 28 is closed by a wall 35 which is shown as being conical with the apex at the upper end. Tubular member 28 is provided with a plurality of radially extending arms 36 adjacent the upper end which serve to center the upper end of the tube 28.

The tubular member 28 is provided with an external spiral flight or flange 38 which extends downwardly from a point adjacent the upper end of the tubular member to a point spaced upwardly somewhat from the base 29. The tubular member 28 is provided with a plurality of openings 40 therein throughout the portion of said tubular member between the ends of said vane 38. The openings 40 are located beneath and close to adjacent portions of said flange.

Adjacent the lower end of the bore 25 there are a plurality of annularly spaced small passages 42 through the wall of the device, said passages communicating with the bore 25 between the lower end of the spiral flange 38 and the base 29. Passages 42 are inclined upwardly and outwardly.

The tube 28 is secured in the bore 25 by means of screws 44 or the like which are received in bores 45 provided therefor in the wall of the body 22 of the separator. The inner ends of said screws are threadably received in tapped bores 46 provided therefor and adapted to be aligned with the bores 45. The heads 47 of the screws are received in external recesses 48 provided therefor in the body of the separator. With this arrangement, the screws may be removed and the tube 28 with its spiral 38, base 29 and arms 36, may be removed for servicing, replacement or the like.

The upper end of the separator is provided with means for attaching same to the lower end of a drill pipe section or the like, said means being shown as a pin 50 of well-known character, although any other suitable means may be used.

In operation, the air or other gas and the liquids are simultaneously injected at the surface into the drill pipe. When the mixture reaches the separator it is given a swirling action by the spiral flange and the liquids are thrown outwardly while the gas or gases pass into the passage 34 of the tubular member 28 by way of the openings 40. Because these openings are beneath the flange and the liquids are thrown outwardly, little or no liquid enters the passage 34. The air or other gas passes downwardly through the opening 27, into the bore 24 and passage 23 and thence about the cutting elements of the bit. The gas is dry so that the cuttings will also be dry and are carried upwardly in this condition. While the liquid and gas may be introduced into the drill string in a premixed condition, the gas may be introduced under pressure into the drill string and simultaneously a liquid sprayed thereinto.

Liquid thrown outwardly by the flange 38 will run down the wall of the bore 25, it being noted that the outer edge of the flange does not engage or come into contact with the wall of said bore 25 so that the liquids separated by the separator device will flow to the lower end of the bore 25 and will be discharged outwardly and upwardly into the annulus 52 and will flow upwardly about the drill string. The dry cuttings from the operation of the bit are carried upwardly and enter into the liquids about the upper part of the separator and the drill string. These cuttings will be carried to the surface and discharged from the well bore before they have time to break down and become a sticky mass. Where foaming agents are used as part of the liquid, these agents will coat the cuttings instead of breaking them down and mixing with them.

From the foregoing it will be apparent that applicant has provided apparatus and method whereby the bit will drill in a dry area and the rest of the drill string will be in a wet area. Also, it is to be understood that the present inventive concept is not limited to the particular type of separator herein disclosed as other types of separators may be used.

It is thought that the invention and many of its attendant advantages will be understood from the foregoing description and it is believed that it will be apparent that various changes may be made in the form, construction and arrangement of the parts of the invention and the method thereof without departing from the spirit and scope of said invention or sacrificing all of its material advantages, the arrangement hereinbefore described being merely for purposes of illustration.

I claim:

1. In apparatus for incorporation in an oil well pipe string through which gaseous fluid with a liquid injected thereinto is adapted to be conducted: a separator, including an elongated body having one end secured to the lower end of a drilling string, said body having an upper longitudinal passage and a lower longitudinal passage aligned therewith; an internal flange between said passages, said flange defining a fluid connection between the upper passage and the lower passage; a separator core disposed in the upper passage and including a longitudinally extending tubular member of substantially smaller outside diameter than the diameter of said upper passage, the lower end of said tubular member communicating with said fluid connection defined by said flange; upwardly pointed means closing the upper end of said tubular member; an enlarged base at the lower end of said tubular member resting on said flange; means defining a seal between said base and the adjacent wall of the upper passage; means engageable with said base for releasably securing the separator core in said upper passage; means adjacent the upper end of the tubular member for centering same in the upper passage; a spiral flange secured to the exterior of said tubular member, the lower end of said flange being spaced upwardly of the base, said tubular member having a plurality of openings therein in that portion coextensive with the spiral flange, said openings being adjacent to but below portions of said spiral flange, and said body having a plurality of annularly spaced upwardly and outwardly extending liquid discharge passages for discharging liquid into the annulus between the drill string and well wall, the inner ends of said liquid discharge passages being disposed in the region between the lower end of the spiral flange and said base; and a drilling bit removably secured to the lower end of said separator body and having passage means connecting the lower passage with the lower end of said bit carrying the cutters so that gaseous fluid separated by the separator will flow about the cutters and carry cuttings upwardly about the exterior of the body of the separator and into the liquid discharged from the liquid discharge passages.

2. In apparatus for incorporation in an oil well pipe string through which gaseous fluid with a liquid injected thereinto is adapted to be conducted: a separator including an elongated body having one end secured to the lower end of a drilling string, said body having a longitudinal passage therethrough with an internal flange in said passage intermediate the ends thereof, said flange defining an opening between the upper portion of the passage and the lower portion thereof; a separator core disposed in the upper portion of the passage above said flange and including a longitudinally extending tubular member of substantially smaller outside diameter than the diameter of said upper passage portion, the lower end of said tubular member communicating with the opening defined by said flange; means closing the upper end of said tubular member; an enlarged base at the lower end of said tubular member; means defining a seal between said base and the adjacent wall of the passage above the flange; means engageable with said base for releasably securing the separator core in said upper passage portion; means adjacent the upper end of the tubular member for centering same in the upper passage portion; a spiral flange secured to the exterior of said tubular member, the lower end of said flange being spaced upwardly of the base, said tubular member having a plurality of openings therethrough in that portion coextensive with the spiral flange, said openings being adjacent to but below said spiral flange, and said body having a plurality of annularly spaced upwardly and outwardly extending liquid discharge passages the inner ends of which being disposed in the region between the lower end of the spiral flange and said base; and a drilling bit removably secured to the lower end of said separator body and having passage means connecting the lower passage portion of the separator body and the lower end of said bit carrying the cutters so that gaseous fluid separated by the separator will flow about the cutters and carry cuttings upwardly and into the liquid discharged from the liquid discharge passages.

3. In apparatus for incorporation in an oil well pipe string through which gaseous fluid with a liquid injected thereinto is adapted to be conducted: a separator including an elongated tubular body having one end secured to the lower end of a drilling string, said body having a longitudinal passage therethrough; an internal flange in said passage intermediate the ends thereof dividing said passage into an upper portion and a lower portion, said flange having an opening therethrough providing a connection between said upper and lower portions; a separator core disposed in the upper portion of the passage above said flange and including a longitudinally extending tubular member of substantially smaller outside diameter than the diameter of said passage portion; means closing the upper end of said tubular member; an enlarged base at the lower end of said tubular member; means securing the separator core in said upper passage portion with the lower end of said tubular member registering with the opening in said flange; a spiral flange secured to the exterior of said tubular member, said tubular member having a plurality of openings therethrough in that portion adjacent to but below said spiral flange, and said body having a plurality of annularly spaced upwardly and outwardly extending liquid discharge passages; and a drilling bit on the lower end of said separator body and having passage means connecting the lower end of the separator body passage and the lower end of said bit carrying the cutters so that gaseous fluid separated by the separator will flow about the cutters and carry cuttings upwardly about the exterior of the body of the separator into the liquid discharged from the liquid discharge passages.

4. In apparatus for incorporation in an oil well pipe string through which gaseous fluid with a liquid injected thereinto is adapted to be conducted: a gas and liquid separator device forming a part of a drilling string; a tubular body; a tubular member in said body and having a passage therein for gas; a spiral flange secured to the exterior of said member, said member having a plurality of openings therethrough, said openings being adjacent to but below said spiral flange, said body having a plurality of liquid discharge passages for conducting liquid into the annulus between the drilling string and well wall; and a drilling bit on the lower end of said body, said bit having passage means for conducting separated gas to the cutters of said bit so that said gas will flow about the cutters and to carry away bit cuttings.

5. A gas and liquid separator, including: an elongated tubular body having one end adapted to be secured to the lower end of a drilling string, said body having a longitudinal passage therethrough with an interal flange adjacent the lower end of said passage dividing said passage into an upper portion and a lower portion, said flange having an opening therethrough providing a connection between the upper and lower portions of the passage; and a separator core disposed in the upper portion of the passage above said flange and including a longitudinally extending tubular member of substantially smaller outside diameter than the diameter of said passage portion, the lower end of said tubular member communicating with the opening in said flange; upwardly pointed means closing the upper end of said tubular member; an enlarged base at the lower end of said tubular member; means defining a seal between said base and the adjacent wall of the passage above the flange; means engageable with said base for releasably securing the separator core in said upper passage portion; means adjacent the upper end of the tubular member for centering same in the upper passage portion; and a spiral flange secured to the exterior of said tubular member, the lower end of said spiral flange being spaced upwardly of the base, said tubular member having a plurality of openings therethrough in that portion coextensive with a spiral flange, said openings being adjacent to but below parts of said spiral flange, and said body having a plurality of annularly spaced upwardly and outwardly extending liquid discharge passages the inner ends of which are disposed in the region between the lower end of the spiral flange and said base.

6. In a gas and liquid separator: an elongated tubular body having one end adapted to be connected into a drilling string of well drilling apparatus, said body having a longitudinal passage therethrough with an internal flange adjacent the lower end of said passage and dividing said passage into an upper portion and a lower portion, said flange having an opening therethrough providing a connection between the upper and lower portion of the passage; and a separator core disposed in the upper portion of the passage above said flange and including a longitudinally extending tubular member of substantially smaller outside diameter than the diameter of said passage portion, the lower end of said tubular member communicating with the connection defined by said flange; means closing the upper end of said tubular member; means adjacent the upper end of the tubular member for centering same in the upper passage portion; and a spiral flange secured to the exterior of said tubular member, the lower end of said flange being spaced upwardly of said internal flange, said tubular member having a plurality of openings therethrough in that portion coextensive with the spiral flange, said openings being adjacent to but below parts of said spiral flange, and said body having a plurality of annularly spaced upwardly and outwardly extending liquid discharge passages, the inner ends of which are disposed in the region between the lower end of the spiral flange and said internal flange.

7. In a gas and liquid separator: an elongated tubular body for connection into a drill string of well drilling apparatus, said body having a longitudinal passage therethrough with an internal flange adjacent the lower end of said passage and dividing said passage into an upper and a lower portion, said flange having an opening therein providing a connection between the upper portion of the passage above said flange and the lower portion of the passage below said flange; a longitudinally extending tubular member of substantially smaller outside diameter than the diameter of the passage portion above the flange, the lower end of said tubular member communicating with said opening; means closing the upper end of said tubular member; and a spiral flange secured to the exterior of said tubular member, the lower end of said flange being spaced upwardly of the first mentioned flange, said tubular member having a plurality of openings therethrough in that portion coextensive with the spiral flange, said openings being adjacent to but below parts of said spiral flange, and said body having a plurality of liquid discharge openings below the lower end of said spiral flange.

8. In a gas and liquid separator: an elongated tubular body, said body having a longitudinal passage therethrough with an annular flange intermediate the ends to separate said passage into an upper portion and a lower portion with a connection therebetween; a separator core disposed in the upper portion of the passage above said flange and including a longitudinally extending tubular member of substantially smaller outside diameter than the diameter of said upper passage portion, said tubular member being arranged in substantially axial relationship to the passage portion and connected at its lower end with the connection between said passage portion, said tubular member being closed at its upper end; and a spiral flange secured to the exterior of said tubular member, the free edge of said flange being spaced inwardly from the adjacent wall of the upper passage portion, said tubular member having a plurality of openings therethrough in that portion coextensive with the spiral flange, said openings being adjacent to but beneath the parts of said flange, and said body having a plurality of liquid discharge passages adjacent the lower end of the upper passage portion and providing openings for the discharge of liquid from the interior of the upper passage portion and the exterior of said body.

9. In apparatus for incorporation in an oil well pipe string through which gaseous fluid with a liquid injected thereinto is adapted to be conducted: an elongated tubular body having a passage therethrough with a fluid inlet at the upper end; a separator core secured in said passage, said separator core having means thereon, including a spiral flange having its free edge separated from the wall of said passage, for centrifugally separating the liquid from the gas, said body having ports therein for the discharge of liquid at the exterior of said body; and passageway means for conducting gas separated from the liquid to a point for discharge into a drilling bit.

10. The method of drilling oil and gas wells comprising: drilling a bore hole with a drill string having a rotary bit at the lower end; introducing a gas under pressure into the drill string and simultaneously spraying a liquid thereinto; centrifugally separating the gas and the liquid at a location above but adjacent to the drilling bit and discharging the liquid outwardly and upwardly into the annulus between the drill string and the well wall above the bit, the gas being removed to a longitudinally central region relative to said location; and conducting the gaseous fluid downwardly into the bit and about the cutters thereof, said gas then flowing upwardly in said annulus and into the liquid being discharged into said annulus, the fluids and cuttings then passing upwardly in said annulus and being discharged at the upper end of said well.

11. The method of drilling oil and gas wells comprising: drilling a bore hole with a drill string having a bit at the lower end; introducing a gaseous fluid under pressure into the drill string and simultaneously spraying a liquid thereinto; centrifugally separating the gaseous fluid and the liquid at a location above but adjacent to the drilling bit and discharging the liquid outwardly into the annulus between the drill string and the well wall above the bit, the gas being removed and collected in a longitudinally central region relative to said location; and passing the gaseous fluid about the cutters of the bit, said gaseous fluid then flowing upwardly in said annulus and into the liquid being discharged into said annulus, the fluids and cuttings then passing upwardly in said annulus.

12. In the method of drilling oil and gas wells: drilling a bore hole with a drill string having a bit at the lower end; introducing gas and liquid drilling fluid under pressure into the drill string; swirling the gas and liquid to effect separation of the gaseous fluid and the liquid at a location above the drilling bit; discharging the liquid outwardly into the annulus about the drill string, said gas being collected in a longitudinally central region relative to said location; and passing the gaseous fluid onto the area being worked upon by the bit, from whence said gaseous fluid passes upwardly into the liquid discharged into said annulus.

13. In the method of drilling oil and gas wells: drilling a bore hole with a drill string having a bit at the lower end; introducing an air and liquid drilling fluid under pressure into the drill string; centrifugally separating the air and liquid at a location above but adjacent to the drilling bit and discharging the liquid outwardly into the annulus about the drill string, the gas being collected in a central region; and passing the air downwardly and about the cutter elements of the bit, said air with entrained cuttings passing upwardly into the liquid discharged into said annulus.

References Cited in the file of this patent

UNITED STATES PATENTS

| | | |
|---|---|---|
| 762,808 | Cushing et al. | June 14, 1904 |
| 2,485,098 | Johnson | Oct. 18, 1949 |
| 2,494,427 | Bidwell et al. | Jan. 10, 1950 |
| 2,705,053 | Morris | Mar. 29, 1955 |
| 2,872,985 | Bertuzzi et al. | Feb. 10, 1959 |
| 2,920,872 | Bauer et al. | Jan. 12, 1960 |